(12) United States Patent
Rapparini

(10) Patent No.: US 10,159,375 B2
(45) Date of Patent: Dec. 25, 2018

(54) METHOD FOR THE PRODUCTION OF BEVERAGES BY MEANS OF CAPSULES

(71) Applicant: AROMA SYSTEM SRL, Bologna (IT)

(72) Inventor: Gino Rapparini, Bologna (IT)

(73) Assignee: Aroma System SRL., Bologna (IT)

( * ) Notice: Subject to any disclaimer, the term of this patent is extended or adjusted under 35 U.S.C. 154(b) by 117 days.

(21) Appl. No.: 15/029,542

(22) PCT Filed: Oct. 17, 2014

(86) PCT No.: PCT/IB2014/065413
§ 371 (c)(1),
(2) Date: Apr. 14, 2016

(87) PCT Pub. No.: WO2015/056238
PCT Pub. Date: Apr. 23, 2015

(65) Prior Publication Data
US 2016/0255988 A1   Sep. 8, 2016

(30) Foreign Application Priority Data

Oct. 17, 2013   (IT) ................ B02013A0570

(51) Int. Cl.
*A47J 31/36* (2006.01)
*B65D 85/804* (2006.01)

(52) U.S. Cl.
CPC ...... *A47J 31/3628* (2013.01); *B65D 85/8043* (2013.01)

(58) Field of Classification Search
CPC ............................................. B65D 85/8043
See application file for complete search history.

(56) References Cited

U.S. PATENT DOCUMENTS

| 4,136,202 | A | 1/1979 | Favre ................ 426/77 |
| 5,242,702 | A | 9/1993 | Fond ................ 426/433 |
| 5,948,455 | A | 9/1999 | Schaeffer et al. ........ 426/77 |
| 8,846,121 | B2 | 9/2014 | Hansen et al. ........ 426/232 |

(Continued)

FOREIGN PATENT DOCUMENTS

| AT | 510344 | 3/2012 |
| CN | 1681425 | 10/2005 |

(Continued)

OTHER PUBLICATIONS

Machine Translation of AT 510344, accessed Dec. 7, 2017.*

*Primary Examiner* — Viren A Thakur
(74) *Attorney, Agent, or Firm* — Fattibene and Fattibene LLC; Paul A. Fattibene

(57) ABSTRACT

A method is provided for the production of beverages by means of a capsule comprising a side wall (5), an entry surface (6) for the entrance of water under pressure into the capsule (1), the side wall (5) and the entry surface (6) forming the containment volume (V) for containing the infusion or soluble product (P), and the entry surface (6) comprising one or more reduced thickness areas (3), wherein the method comprises the following steps: pushing the entry surface (6) of the capsule (1) using pushing means (S) and injecting a flux of water under pressure so as to open the one or more reduced thickness areas (3) of the entry surface (6) so as to allow the water under pressure to enter the capsule (1).

9 Claims, 13 Drawing Sheets

(56) References Cited

U.S. PATENT DOCUMENTS

| | | | |
|---|---|---|---|
| 2002/0078831 A1* | 6/2002 | Cai | A47J 31/14 |
| | | | 99/295 |
| 2003/0056661 A1 | 3/2003 | Hu et al. | 99/495 |
| 2003/0217643 A1* | 11/2003 | Masek | B65D 85/8043 |
| | | | 99/279 |
| 2010/0064899 A1* | 3/2010 | Aardenburg | A47J 31/3633 |
| | | | 99/295 |
| 2011/0041702 A1 | 2/2011 | Yoakim et al. | 99/302 |
| 2012/0258210 A1* | 10/2012 | Wong | A47J 31/3695 |
| | | | 426/115 |
| 2013/0064936 A1* | 3/2013 | Meelker | B65D 85/8043 |
| | | | 426/112 |
| 2014/0130678 A1* | 5/2014 | Frydman | B65D 85/8043 |
| | | | 99/295 |
| 2015/0050391 A1 | 2/2015 | Rapparini | 426/115 |

FOREIGN PATENT DOCUMENTS

| | | | | |
|---|---|---|---|---|
| EP | | 1364605 | 11/2003 | |
| EP | | 2284102 B1 * | 7/2013 | A47J 31/3628 |
| WO | WO 2004/026091 | | 4/2004 | |
| WO | WO-2008132571 A1 * | | 11/2008 | B65D 85/8043 |
| WO | WO 2011/154672 | | 12/2012 | |

\* cited by examiner

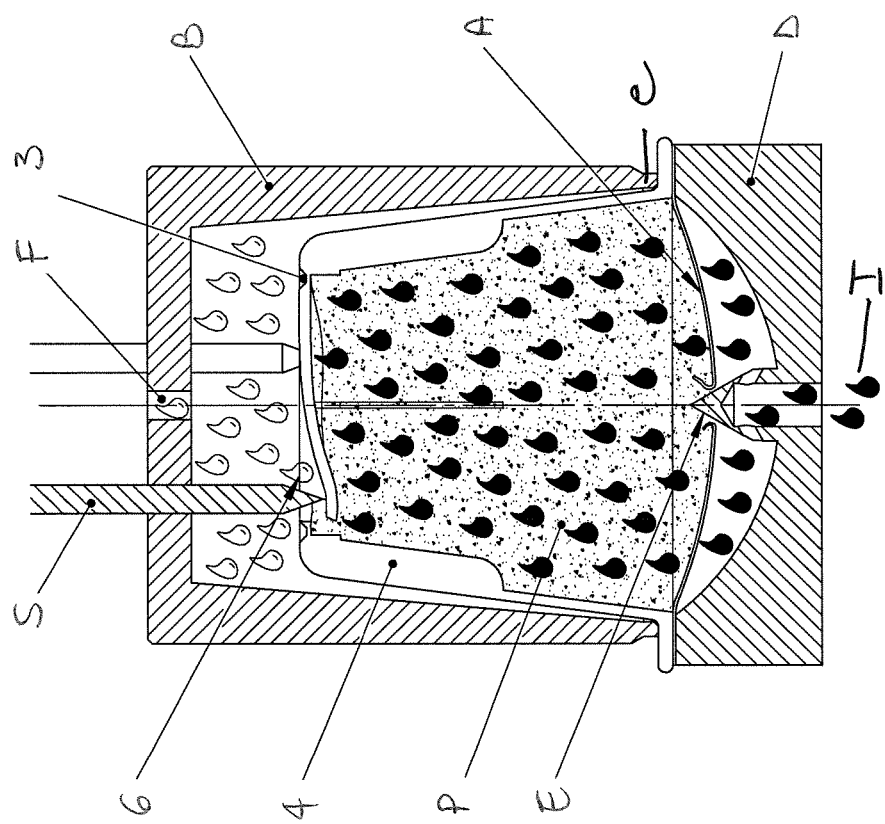

METHOD FOR THE PRODUCTION OF BEVERAGES BY MEANS OF CAPSULES

TECHNICAL FIELD

The present invention relates to the technical field of capsules to obtain infusions such as espresso. In particular, the present invention refers to the field of employment of injection molded capsules, hermetically sealed and containing infusion products, such as espresso coffee, or water-soluble products, such as milk or cacao.

STATE OF THE ART

Different types of capsules for infusion products such as espresso are known. Examples of known capsules from the state of the art can be found in U.S. Pat. No. 5,948,455, U.S. Pat. No. 5,242,702, US 2003/056661 and IT 1133901. Moreover, several methods of Using these capsules are known. These can, in fact, be used in several types of beverage-making machines, with different components and features.

Unfortunately, the different beverage-making machines are often not compatible with a plurality of types of capsules and vice versa. The problem to be solved is therefore that of providing an efficient method for obtaining beverages using capsules.

SUMMARY

The present invention provides a method in which a capsule for obtaining infusions, such as espresso, is used, that comprises the exertion of pressure on the entry surface of the capsule by using suitable pushing means and the injection of a flux of water under pressure against the entry surface of the capsule which is provided with one or more reduced thickness areas so that said one or more reduced thickness areas are kept in tension by the pushing means and their opening is due to the effect of the pressure of the water, allowing in this way the water under pressure to enter into the capsule. The reduced thickness areas are, for example, the regions of the entry surface having a lower thickness with respect to the thickness of the entry surface.

According to the present invention a method is provided in which a capsule is used, the capsule comprising a lateral wall and an entry surface for the entry of the water under pressure into the capsule, the lateral wall and the entry surface forming a containing volume for containing the infusion or soluble product and the entry surface comprising one or more reduced thickness areas, wherein the method comprises the following steps: pushing on the entry surface of the capsule by using pushing means, and injecting a flux of water under pressure against the entry surface of the capsule so as to cause the opening of the reduced thickness area of the entry surface to allow the water under pressure to enter the capsule. In this way, the method according to the present invention can be used in any beverage-making machine which has pushing means that press on the entry surface of the capsule putting under tension the reduced thickness areas, without opening them.

According to a further embodiment of the present invention, a method is provided in which the pressure on the entry surface of the capsule by using the pushing means puts in tension the reduced thickness areas on the entry surface. In this way, the reduced thickness areas will be easily opened by water pressure on the entry surface of the capsule.

According to a further embodiment of the present invention a method is provided in which the injection of a flux of water under pressure against the entry surface of the capsule induces the opening of the reduced thickness areas of the entry surface so as to allow the water under pressure to enter inside the capsule.

According to a further embodiment of the present invention a method is provided in which the pushing means comprise and one or more pistons, blades, needles or similar. The pushing means can be fixed to the other components of the beverage-making machine or movable with respect to same.

According to a further embodiment of the present invention a method is provided in which the pushing means do not penetrate or only partially penetrate the entry surface of the capsule in order to avoid perforating the entry surface. No apertures are opened in the entry surface in correspondence to the areas where the pushing means press. In this way the pressure exercised by the pushing means puts tension on the reduced thickness area so as to ease their opening due to water pressure.

According to a further embodiment of the present invention, a method is provided in which the pushing means push on the entry surface of the capsule in a portion of the entry surface not occupied by the reduced thickness areas. In this way, the pushing means do not directly press on the reduced thickness area on the entry surface of the capsule, avoiding obstructing them.

According to a further embodiment of the present invention, a method is provided which further comprises the following step: piercing an exit surface of the capsule opposite with respect to the entry surface, so as to allow the beverage to exit from the capsule.

According to a further embodiment of the present invention, a method is provided in which a capsule is used that is injection molded.

According to a further embodiment of the present invention, a method is provided in which a capsule that is realized in plastic thermoformable material, is used.

According to a further embodiment of the present invention, a method is provided in which a capsule that is made of biological material, is used.

According to a further embodiment of the present invention, a method is provided in which a capsule, that is used to obtain infusion beverages such as tea or coffee, for example, espresso is used. The capsule may therefore contain infusion products, such as tea leaves or powdered coffee, which are suitable for producing infusion beverages. This means that, after the production of the beverage, a solid residue remains inside the capsule.

Alternatively, according to a further embodiment of the present invention, a method is provided in which a capsule that is used to obtain beverages by means of soluble products, as for example, powdered milk, cacao or similar, is employed. In this way, after the production of the beverages, no residue remains inside the capsule.

According to a further embodiment of the present invention, a method is provided in which a capsule to obtain infusions such as espresso comprises a lateral wall and an entry surface for the entry of water under pressure inside the capsule, the side wall and the entry surface forming a containing volume to contain the infusion product, in which the entry surface comprises one or more reduced thickness areas so that, allowing water under pressure to run against the entry surface, the one or more reduced thickness areas open so as to allow water under pressure to enter inside the capsule. Since the reduced thickness areas of the entry surface open due to the flux of water under pressure, it is possible to avoid the employment of dedicated components of the beverages beverage-making machines to pierce the capsule. Moreover, the capsule according to the present invention can be realized in an easy and economical way. For example, this capsule may be injection-molded. The entry surface may be, for example, the bottom of the capsule. The reduced thickness areas may be formed on the outer surface or on the inner surface of the entry surface. When the reduced thickness areas are formed on the inner surface of the entry surface, the entry surface may, for example, have blind holes, hollows or splits placed on the outside of the capsule and therefore visible when the capsule is packed. When on the contrary the reduced thickness areas are formed on the inner surface of the entry surface placed on the inside of the capsule, the outer surface of the inner surface can be smooth and uniform. The reduced thickness areas may be displaced on the inner surface of the entry surface according to several arrangements.

According to a further embodiment of the present invention, a method is provided in which a capsule is used having the lateral wall and the entry surface formed as a single body. In this way, the lateral wall and the entry surface can easily be formed, for example, by using injection molding.

According to a further embodiment of the present invention, a method is provided in which a capsule is used further comprising a uniform thickness plane so as to support a closing element so as to hermetically close the capsule, the uniform thickness plane being placed at the extremity opposite to the lateral wall with respect to the entry surface so that the closing element forms an exit surface opposite to the entry surface for the exit of the beverage from the capsule. The uniform thickness plane provides a surface to which it is possible to fix the closing element of the capsule. The capsule may therefore be hermetically sealed so as to preserve over time the organoleptic properties of the contained product. The closing element may comprise, for example, a closing membrane made of a peel-able barrier film. The closing element may be made of biological material. The beverage exits the capsule through the closing element of same. The closing element forms an exit surface which is opposite with respect to the entry surface: in this way, the water under pressure that enters the capsule through the entry surface goes through the entire volume of the capsule before exiting from same as a beverage. In this way, the infusion process is particularly efficient and involves the entire infusion product contained in the capsule. The quality of the obtained beverage is particularly good. The uniform thickness plane, the lateral wall and the entry surface may be advantageously formed as a single body. For example, these three elements may be formed using injection molding.

According to a further embodiment of the present invention, a method is provided in which a capsule is used in which the one or more reduced thickness areas are placed along one or more diameters of the entry surface. Placing the reduced thickness areas along one or more diameters of the entry surface allows letting water under pressure entering inside the capsule so as to be uniformly distributed in the inner volume of the capsule. The horizontal section of the capsule may, for example, be circular so that the entry surface of the capsule has a circular shape.

According to a further embodiment of the present invention, a method is provided in which a capsule is used, which comprises a plurality of reduced thickness areas placed radially with respect to the center of said entry surface. The distribution of the water inside the volume of the capsule is therefore further optimized. In particular, it is avoided that regions of the volume of the capsule are not reached by the flux of water. In this way, waste of the product contained inside the volume of the capsule is avoided and the quality of the produced beverages is optimized.

According to a further embodiment of the present invention, a method is provided in which a capsule is used which comprises one or more reduced thickness areas having a circular shape. This shape is particularly simple to realize. Moreover, the circular shape of the reduced thickness areas ensures a homogenous distribution inside the capsule of the water entering the capsule through the circular reduced thickness areas. In particular, in this way it is possible to avoid that there are regions of the volume inside the capsule that are not easily reached by the entering flux of water. The capsule could moreover be provided with a plurality of reduced thickness areas having a circular shape, for example, a plurality of concentric reduced thickness areas. For instance, the capsule could be provided with two or three reduced thickness areas having a circular shape. The two or three circular reduced thickness areas could be concentric.

According to a further embodiment of the present invention, a method is provided in which a capsule in which the one or more reduced circular thickness areas are centered on the center of the entry surface. This allows further optimization of the distribution of water inside the capsule.

According to a further embodiment of the present invention, a method is provided in which a capsule is used in which the one or more reduced thickness areas are realized in an elastic material so that after they have been put in tension by the pushing means and opened by the water under pressure, they return to the closing position when the pressure stops. The reduced thickness areas may, for example, be ripped open and therefore opened by the action of the water under pressure. At the same time, thanks to the elasticity of the reduced thickness areas, when the pressure stops, they can return to their closing position. This is particularly advantageous because it allows avoiding the unwanted exit of the infusion product from the capsule after same has been used. In this way, the cleaning of the machines, in which the capsules according to the present invention are used, is simplified. Moreover, it is easier to avoid spreading the product contained inside the capsule when the capsule is handled after it has been used.

According to a further embodiment of the present invention, a method is provided in which a capsule is used which further comprises one or more reinforcement ribs placed on the entry surface so as to reinforce the entry surface and facilitate the opening of the reduced thickness areas when the water under pressure flows against the entry surface. The presence of the reinforcement ribs is particularly advantageous because it simplifies the opening of the reduced thickness areas. In particular, the entry surface is reinforced and therefore stabilized by the ribs. In this way, the water under pressure which presses on the outside of the entry surface does not modify, or only barely modifies the shape of the entry surface, which is deformed on the other side due to the effect of the pushing elements, but opens the reduced thickness areas.

According to a further embodiment of the present invention a method is provided in which a capsule is used in which the one or more reinforcement ribs do not intersect the one or more reduced thickness areas of the entry surface. In this way, the reduced thickness areas are not blocked by the presence of the reinforcement ribs and can easily open due to the water under pressure.

According to a further embodiment of the present invention a method is provided in which a capsule is used in which at least one of the reinforcement ribs intersects the centre of the entry surface. This embodiment of the present invention is particularly advantageous because it allows the reinforcement of the entry surface of the capsule in an efficient way. Since the centre of the entry surface is provided with at least a reinforcement rib, the deformation of the entry surface due to the effect of the water under pressure is efficiently avoided or at least reduced. This further simplifies the opening of the reduced thickness areas due to the water under pressure.

According to a further embodiment of the present invention a method is provided in which a capsule is used in which the one or more reinforcement ribs are placed along one or more diameters of the entry surface. The reinforcement of the entry surface is optimized by this particular displacement of the reinforcement ribs.

According to a further embodiment of the present invention a method is provided in which a capsule is used which comprises a plurality of reinforcement ribs placed radially with respect to the centre of the entry surface. The reinforcement of the entry surface is optimized by this particular disposition of the reinforcement ribs.

According to a further embodiment of the present invention a method is provided in which a capsule is used in which the reinforcement ribs intersect in the centre of the entry surface. This allows strengthening of the entry surface of the capsule in a particularly efficient way.

According to a further embodiment of the present invention a method is provided in which a capsule is used in which the one or more reinforcement ribs are made of elastic material so as to allow the entry surface to bend under the action of the pushing means and of the water under pressure and to return to the original configuration when pressure is no longer exerted on the entry surface of the capsule.

According to a further embodiment of the present invention a method is provided in which a capsule is used in which the elasticity of one or more reduced thickness areas is greater than the elasticity of the reinforcement ribs. In this way, the reduced thickness areas can bend more with respect to the reinforcement ribs and they are easy to open due to the water under pressure. Moreover, the elasticity of the reinforcement ribs simplifies the closing of the reduced thickness areas after they have been opened and after the pressure exerted both by the pushing means and the water under pressure on the entry surface of the capsule ends. This occurs because the ribs have a tendency to replace the entry surface in the initial configuration, substantially flat, in which the areas of reduced thickness are closed. The undesired exit of the infusion product contained in the capsule is therefore efficiently avoided.

According to a further embodiment of the present invention a method is provided in which a capsule is used in which the reinforcement ribs are placed inside the capsule. The capsule can therefore be easily produced. Moreover, the capsule can be easily handled.

According to a further embodiment of the present invention a method is provided in which a capsule is used in which at least one of the reinforcement ribs comprises a base portion substantially parallel and adjacent to the entry surface and, at each of the extremities of the base portion, an arm so that the reinforcement ribs are substantially U-shaped. The arms may, for example, be substantially perpendicular to the base portion. Moreover, the arms may extend along a direction substantially parallel to the direction of the lateral wall of the capsule. If, for example, the wall has a frusto-conical shape, the arms may be tilted with respect to the perpendicular line to the base portion so as to follow the oblique shape of the lateral wall. The arms of the reinforcement ribs may be adjacent to the inner surface of the side wall of the capsule. For example, the surface of the arms of the reinforcement ribs is perpendicular to the lateral wall of the capsule and the borders of this surface facing outwardly with respect to the capsule are in contact with the inner surface of the lateral wall. The base portion and the arms may be formed as a single body. For example, they may be formed by injection molding. The presence of the ribs having substantially a "U" shape is particularly advantageous because it allows strengthening the entire structure of the capsule. Moreover, the reinforcement ribs having substantially a "U" shape reduce, without eliminating it, the elasticity of the water entry surface of the capsule, only in the regions in which they are placed.

According to a further embodiment of the present invention a method is provided in which a capsule is used in which at least one of the reinforcement ribs comprises a first portion substantially parallel and adjacent to the lateral wall and a second portion substantially parallel and adjacent to the entry surface so that the reinforcement rib are substantially an L-shaped. This configuration of the reinforcement ribs is particularly advantageous, for example, in the case in which the reduced thickness area has a circular shape. In this case, the second portion of the reinforcement rib could advantageously extend from the lateral surface of the capsule to an adjacent position to the reduced thickness area so as to reinforce the portion of the entry surface of the capsule facing outwardly with respect to the reduced thickness area having a circular shape.

According to a further embodiment of the present invention a method is provided in which a capsule is used in which the reinforcement ribs on the inner surface of the bottom of the capsule have as an aim of simplifying the opening of the reduced thickness area when the capsule is under pressure from the outside and to elastically bring these areas back in closure when the external pressure ends, preventing the coffee particles inside the capsule from exiting. The inner ribs of the capsule are not in direct opposition to the reduced thickness area but displaced according to several arrangements.

According to a further embodiment of the present invention a method is provided in which a capsule is used in which the reduced thickness areas are formed on the bottom of the capsule either from the inner side to the outer side or from the outer side to the inner side.

According to a further embodiment of the present invention a method is provided in which a capsule is used in which the closing element comprises a closing membrane made of barrier film. The membrane can be easily deformed outwardly by the water under pressure injected inside the capsule, so that the beverage remains in infusion for a predetermined period of time before exiting through the hole or holes performed on the closing membrane.

According to a further embodiment of the present invention a method is provided in which an injection molded capsule is used to obtain infusions such as espresso, the capsule comprising a uniform thickness plane and on reduced thickness areas and reinforcement ribs on the bottom, and being suitable to be hermetically closed by means of a closing element, wherein wrapping the capsule with a hollow cylinder that hermetically closes on the uniform thickness plane, exercising by using the pushing means, a pressure on the entry surface of the capsule and injecting water under pressure inside the hollow cylinder, the areas of the capsule having a reduced thickness, contrasting and in cooperation with the reinforcement rib, opens and the water under pressure enters the capsule, deforming outwardly the closing element, which, comes into contact with needles, is pierced and the beverage flows outwardly.

According to a further embodiment of the present invention a method is provided in which a capsule is used in which, being same made of elastic material, the reduced thickness areas have a greater bending due to the external pressure of the pushing means and of the water under pressure with respect to the reinforcement ribs and they open.

According to a further embodiment of the present invention a method is provided in which a capsule is used wherein the reinforcement ribs, being made of elastic material, bends under the external pressure of the pushing means and of the water under pressure and return to the original position when the pressure ends contributing to the closure of the reduced thickness areas opened under the pressure exerted by the water.

According to a further embodiment of the present invention a method is provided in which a capsule is used wherein when the capsule is subjected to the external pressure of the pushing means and of the water under pressure, the reduced thickness areas, more elastic than the reinforcement ribs, stretch due to the effect of the pressure of the pushing means and they open due to the effect of the water pressure and the water enters the capsule. When the pressure ends, the reinforcement ribs bring the reduced thickness areas back in the closed position, preventing the product from exiting.

According to a further embodiment of the present invention a method is provided in which a capsule is used which has inner reinforcement ribs having a shape and a position that so as to simplify the opening of the reduced thickness areas when the capsule is subject to the external pressure and to bring these areas back into the close position when the pressure stops.

BRIEF DESCRIPTION OF THE FIGURES

The present invention will be described with reference to the attached Figures in which the same numbers and/or reference signs indicate the same parts and/or similar parts and/or corresponding parts of the system. In the figures:

FIG. 12 schematically shows a cross-sectional view of the system shown in FIG. 10 after the injection means have started to inject water under pressure, the base of the capsule is further bent, the reduced thickness areas are open, the water enters the capsule, the closing element is deformed outwardly against the needle which has pierced the closing element and the beverages flow outwardly.

DETAILED DESCRIPTION

Figure 1:
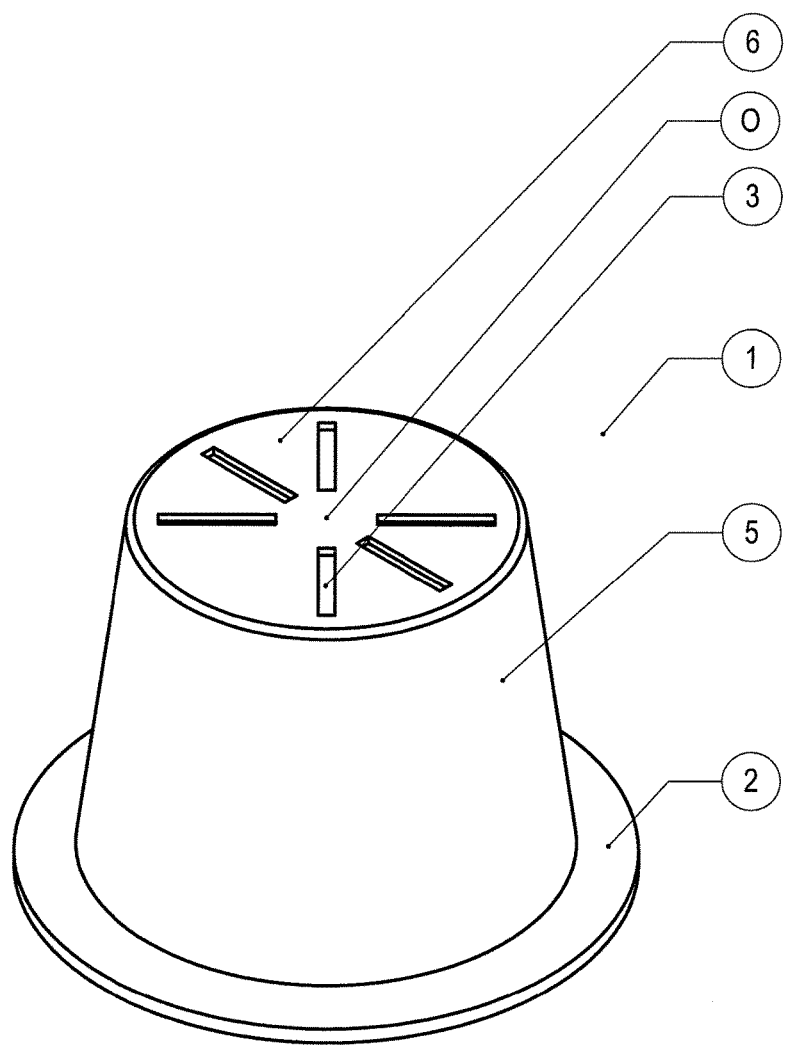
FIG. 1 schematically shows a 3D outer view of a capsule that can be used according to an embodiment of the present invention.

In the following, the present invention is described with reference to particular embodiments as shown in the appended drawings. Nevertheless, the present invention is not limited to the particular embodiments described in the following detailed description and shown in the drawings, but rather, the embodiments described simplify several aspects of the present invention, the scope of which is defined by the claims. Further modifications and variations of the present invention will be clear to the skilled person.

FIG. 1 schematically shows a 3D outer view of a capsule 1 to obtain infusions such as espresso. The capsule 1 comprises a lateral wall 5 and one entry wall 6 for the entry of the water under pressure inside the capsule 1. The lateral wall 5 and the entry wall 6 are formed as a unique body. In particular, the lateral wall 5 and the entry wall 6 are made of the same material and can for example be formed by injection molding. For example, the lateral wall 5 and the inner surface 6 can be made of deformable plastic material. Furthermore, the lateral wall 5 and the entry wall 6 form the containing volume V to contain the infusion product or the soluble product for the production of the desired beverage. In the case shown in FIG. 1, the entry surface 6 corresponds to the bottom of the capsule 1. FIG. 1 shows that the entry surface 6 is provided with reduced thickness areas 3. The reduced thickness areas 3 are areas of the entry surface 6 having a lower thickness with respect to the thickness of the other areas of the entry surface 6. According to the present invention, the reduced thickness areas could have, for example, a thickness that varies between a half and a twentieth of the thickness of the entry surface. Preferably, the reduced thickness areas have a thickness between a fifth and a fifteenth of the thickness of the entry surface. The reduced thickness areas may have, for example, a thickness equal to a tenth of the thickness of the entry surface. For example, the entry surface may have a thickness equal to about 0.5 mm while the reduced thickness area could have a thickness equal to 0.05 mm. FIG. 1 shows the presence of reduced thickness areas 3 on the entry surface 6. The number of reduced thickness areas 3 may vary. The entry surface 6 can for example comprise only one reduced thickness area. Moreover, the entry surface 6 can comprise two or more reduced thickness areas 3. The entry surface 6 has a circular shape and the reduced thickness areas 3 comprise slots placed along three diameters of the entry surface 6. The length of the slots corresponds to a portion of each of the diameters of the entry surface 6. The reduced thickness areas 3 are arranged radially with respect to the centre O of the entry surface 6. The number and the disposition of the reduced thickness areas 3 on the entry surface 6 can vary. The reduced thickness areas 3 shown in the example of FIG. 1 are formed from the outside towards the inside of the capsule 1. In particular, the outer surface of the entry surface 6 is not flat and smooth but presents some depressions which correspond to reduced thickness areas 3. Alternatively, according to the present invention, the reduced thickness areas 3 can be formed from the inside toward the outside of the capsule. In this case, the outer surface of the entry surface 6 is flat and smooth, while the inner surface of the capsule of the entry surface 6 has depressions or grooves which correspond to the reduced thickness areas 3. The capsule 1 shown in FIG. 1 further comprises a plane having a uniform thickness 2. In particular, FIG. 1 shows the lower surface of the uniform thickness plane 2, i.e. the surface of the uniform thickness plane 2 facing the bottom of the capsule or, in any case, facing the entry surface of the water 6. The uniform thickness plane 2 is placed at the opposite extremity of the side wall 5 with respect to the extremity of the side wall 5 where the entry surface 6 for the water under pressure is placed.

The uniform thickness plane 2, the side wall 5 and the entry surface 6 can advantageously be formed as a single body. For example, the uniform thickness plane 2, the side wall 5 and the entry surface 6 may be made of the same material, for example a thermoformable plastic material. These three elements can be for example formed by injection molding. The horizontal section of the capsule 1 shown in FIG. 1 is circular. The entry surface 6 has therefore a circular shape. Similarly, the uniform thickness plane 2 consists of an annular border substantially parallel to the entry surface 6. The side wall 5 has a frusto-conical shape. The upper base of the frusto-conical shape corresponds to the bottom of the capsule and therefore to the entry surface 6. The lower surface of the frusto-conical shape is surrounded by the annular structure of the uniform thickness plane 2. Alternatively, the side wall 5 may have a cylindrical shape.

Moreover, according to alternative embodiments of the present invention, capsules having a polygonal horizontal section, for example square or hexagonal, may be used.

Figure 2:
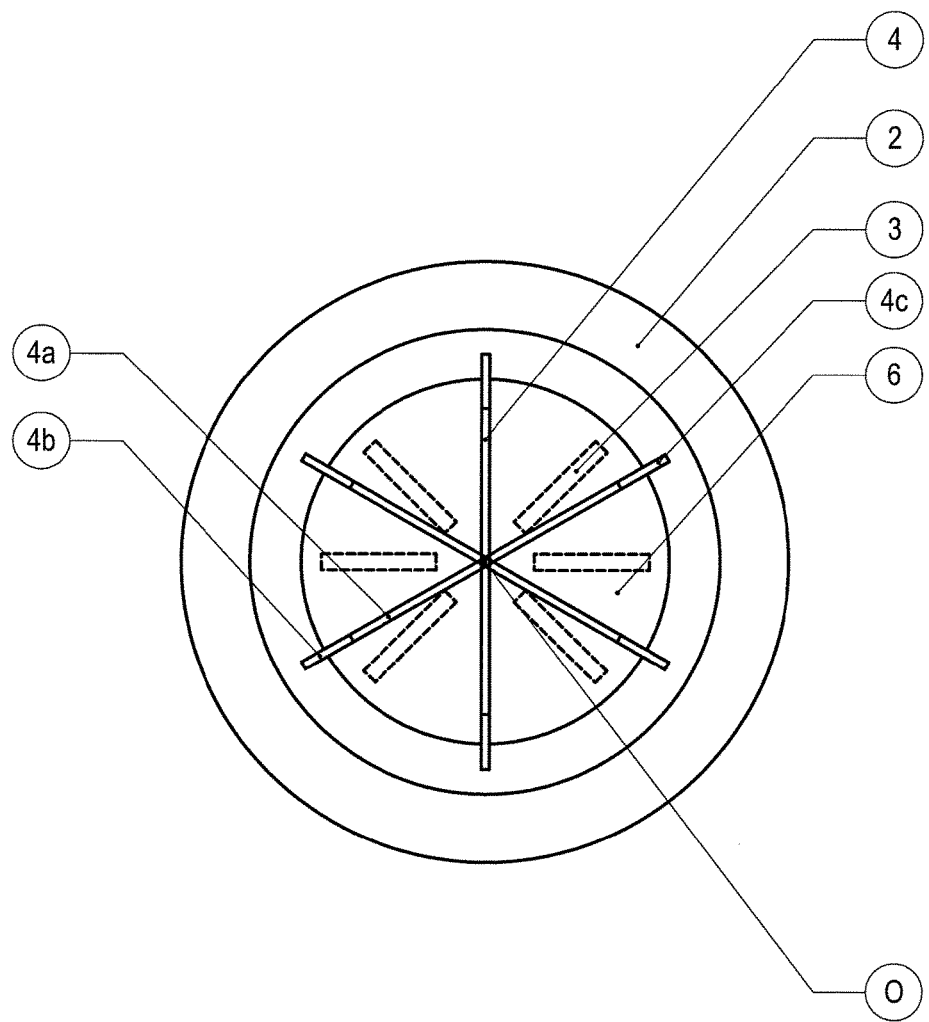
FIG. 2 schematically shows an inner view from above of the capsule that can be used according to an embodiment of the present invention.

FIG. 2 schematically shows an inner view from above of the capsule 1 shown in FIG. 1. The figure shows the upper surface of the uniform thickness plane 2. Moreover, the figure shows the inner surface of the capsule of the entry surface 6 of the water under pressure. The reduced thickness areas 3 of the entry surface 6 of the water are indicated by dotted lines. Moreover, the figure shows that the inner surface to the capsule of the entry surface 6 of the water under pressure is provided with reinforcement ribs 4. The reinforcement ribs 4 reinforce the entry surface 6 and simplify the opening of the reduced thickness areas 3 when the water under pressure flows against the outer face of the entry surface 6. The reinforcement ribs 4 shown in FIG. 2 do not intersect the reduced thickness areas 3. Moreover, the reinforcement ribs 4 are arranged along three diameters of the entry surface 6 and they intersect at the centre O of entry surface 6. The reinforcement ribs 4 have a length substantially corresponding to the length of the diameter of the inner surface of the entry surface 6. The number and position of the reinforcement ribs 4 on the entry surface 6 can vary. For example, the system can comprise a single reinforcement rib 4. Alternatively, the system can comprise two or more reinforcement ribs 4. FIG. 2 shows three reinforcement ribs 4.

Figure 3:
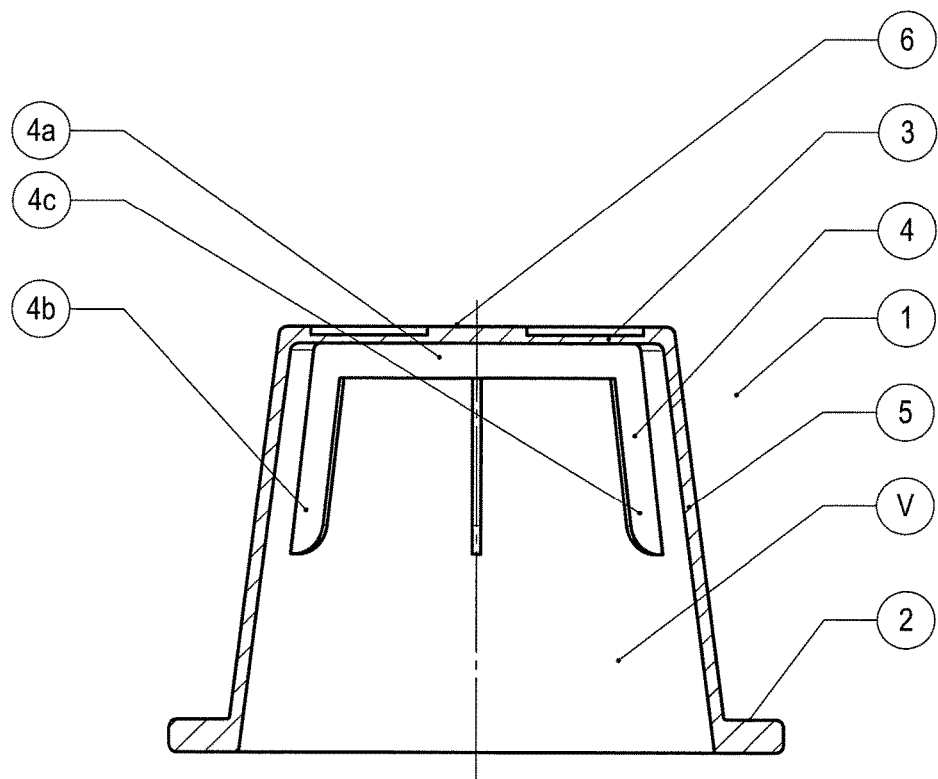
FIG. 3 schematically shows a cross-sectional view of the capsule that can be used according to an embodiment of the present invention along one of the diameters of the entry surface along which the reduced thickness areas are realized.

FIG. 3 schematically shows a cross-sectional view of the capsule 1 shown in FIGS. 1 and 2 along one of the diameters of the entry surface 6 along which areas of reduced thickness 3 are realized. It has to be noted that the side wall 5 and the entry surface 6 of the water under pressure forms the containing volume V of the capsule 1, that is the volume that can be filled with the product necessary for the production of the desired beverage. The Figure shows in cross-section two of the reduced thickness areas 3 of the entry surface 6. The two reduced thickness areas are formed outwardly towards the inner side of the capsule.

Figure 3A:
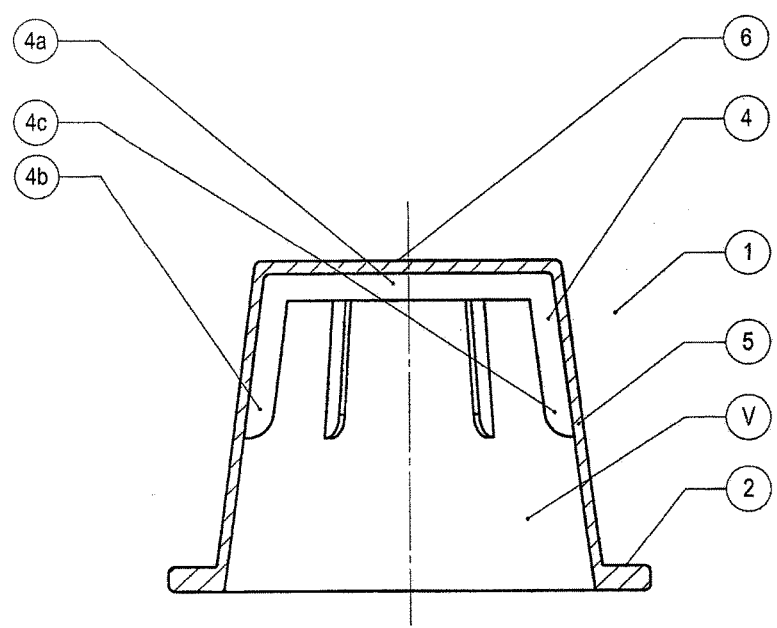
FIG. 3*a* schematically shows a cross-sectional view of the capsule shown in FIG. 3 along one of the diameters of the entry surface along which a reinforcement rib is realized.

FIG. 3a schematically shows a cross-sectional view of the capsule of FIG. 3 along one of the diameters of the entry surface 6 along which a reinforcement rib 4 is realized. FIG. 3b therefore shows in detail the structure of one of the reinforcement ribs 4. The reinforcement rib substantially has a U-shape with a base portion 4a substantially parallel and adjacent to the inner surface of the entry surface 6 and two arms 4b and 4c. The arms 4b and 4c extend in a direction substantially parallel to the side wall 5 of the capsule 1. In particular, for the case shown in FIG. 3b the base portion 4a of the rib 4 has a length equal to the diameter of the inner surface of the entry surface 6. The arms 4b and 4c extend in a direction substantially parallel to the frusto-conical side wall 5 of the capsule so that the projection of the arms 4b and 4c on the plane of the entry surface 6 occupies a length larger than the diameter of the inner surface the entry surface 6. The arms 4b and 4c of the reinforcement rib are adjacent to the inner surface of the side wall 5 of the capsule. The surface defined by the arms 4b and 4c and by the portion of the base 4a of the reinforcement rib 4 is perpendicular to the side wall 5 of the capsule and the lateral borders of this surface are in contact with the side wall 5. This is also visible in FIG. 2 in which the circumference having the smallest diameter represents the inner surface of the entry surface 6 of the capsule. The circumference having an intermediate diameter represents the opening of the volume V of the capsule at the level of the uniform thickness plane 2. It can be noted that the extremity of the arms 4b and 4c protrudes with respect to the circumference having the smallest diameter, since the arms 4b and 4c have the same inclined trend of the frusto-conical lateral wall 5.

According to alternative embodiments of the present invention, the arms 4b and 4c can also extend in a direction substantially perpendicular with respect to the base portion 4a inside the containing volume V of the capsule. Furthermore, in the example shown in FIG. 3b, the arms 4b and 4c of the reinforcement ribs 4 have a height equal to about half of the height of the containing volume V of the capsule. The arms can have different heights. For example, the arms of the reinforcement ribs can occupy the entire height of the lateral wall of the capsule. The presence of the reinforcement rib having substantially a "U" shape is particularly advantageous because it allows the reinforcement of the entire structure of the capsule.

Figure 4:
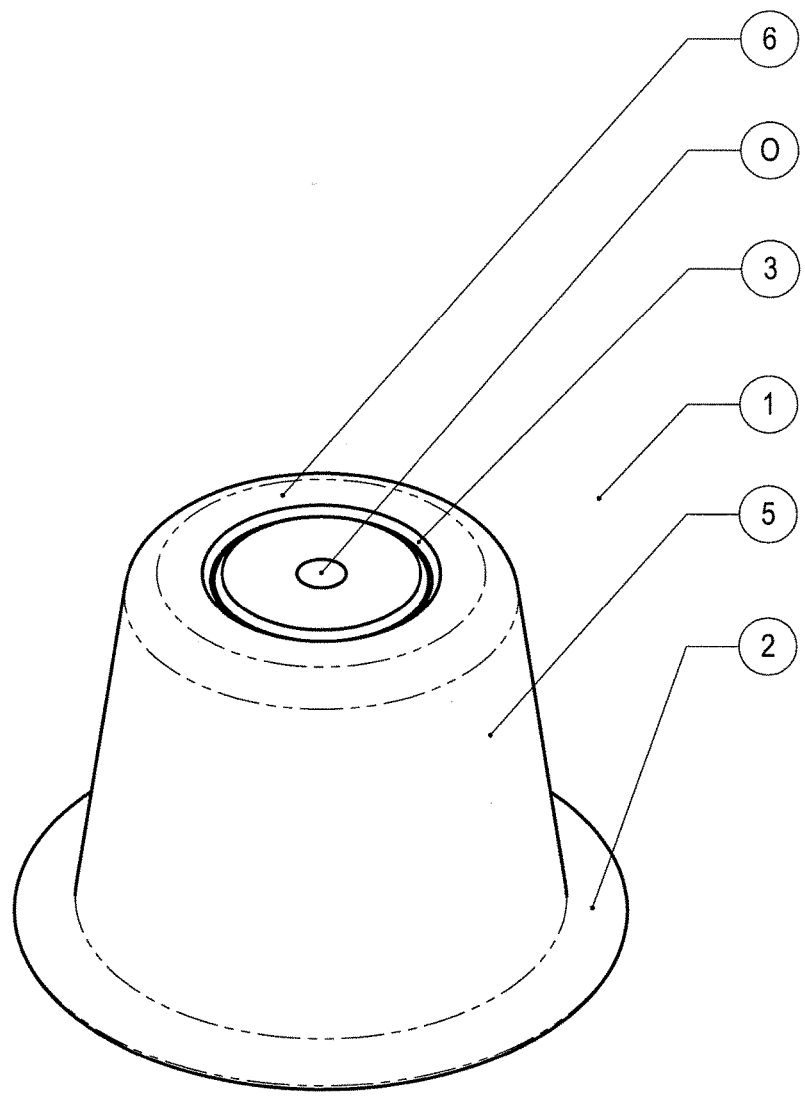
FIG. 4 schematically shows an outer three-dimensional view of a capsule that can be used according to a further embodiment of the present invention.

FIG. 4 schematically shows a capsule comprising a side wall 5 and an entry surface 6 for the entry of the water under pressure inside the capsule 1. The side wall 5 and the entry surface 6 are formed in a unique body. In particular, the side wall 5 and the entry surface 6 are made of the same material and can, for example, be formed by injection molding. For example, the side wall 5 and the entry surface 6 can be made of a thermoformable plastic material. Moreover, the side wall 5 and the entry surface 6 form the containing volume V to contain the infusion or soluble product for the production of the desired beverage. For the case shown in FIG. 4, the entry surface 6 corresponds to the bottom of the capsule 1. The capsule 1 shown in FIG. 4 comprises, on the entry surface 6, a reduced thickness area 3 having a circular shape. The reduced thickness area 3 having a circular shape is centered in the centre O of entry surface 6. In addition, the reduced thickness area 3 is formed from the outside towards the inside of the capsule so that the outer surface of the entry surface 6 is not smooth and flat. Alternatively, the reduced thickness area 3 can be formed from the inside toward the outside of the capsule so that the outer surface of the entry surface 6 is flat and smooth. The circular reduced thickness area 3 shown in FIG. 4 is continuous, i.e. it describes a full circle without interruption.

Alternatively, the circular reduced thickness area 3 can be discontinuous, for example, it can be formed by a plurality of curved segments. Moreover, the capsule can comprise a plurality of circular reduced thickness areas, for example a plurality of concentric circular reduced thickness areas.

The capsule can for example comprise two or more reduced thickness circular and concentric areas, preferably centered on the centre of the entry surface 6. The circular reduced thickness areas can have, for example, a thickness that varies between a half and a twentieth of the thickness of the entry surface. Preferably, the reduced thickness areas have a thickness between one-fifth and one-fifteenth of the thickness of the entry surface. The reduced thickness areas can, for example, have a thickness equal to one-tenth of the thickness of the entry surface. For example, the entry surface may have a thickness equal to about 0.5 mm, while the reduced thickness areas may have a thickness equal to 0.05 mm. Furthermore, the thickness of the circular reduced thickness areas 3 can vary along the perimeter of the area itself. For example, the circular reduced thickness areas 3 can have one or more portions having a thickness greater than the other portions of the circular area 3. The thickness can also vary in a continuous way along the perimeter of the reduced thickness areas having a circular shape going from a minimum thickness to a maximum thickness, and having the maximum thickness which could be equal to or less than the thickness of the entry surface 6.

Figure 5:
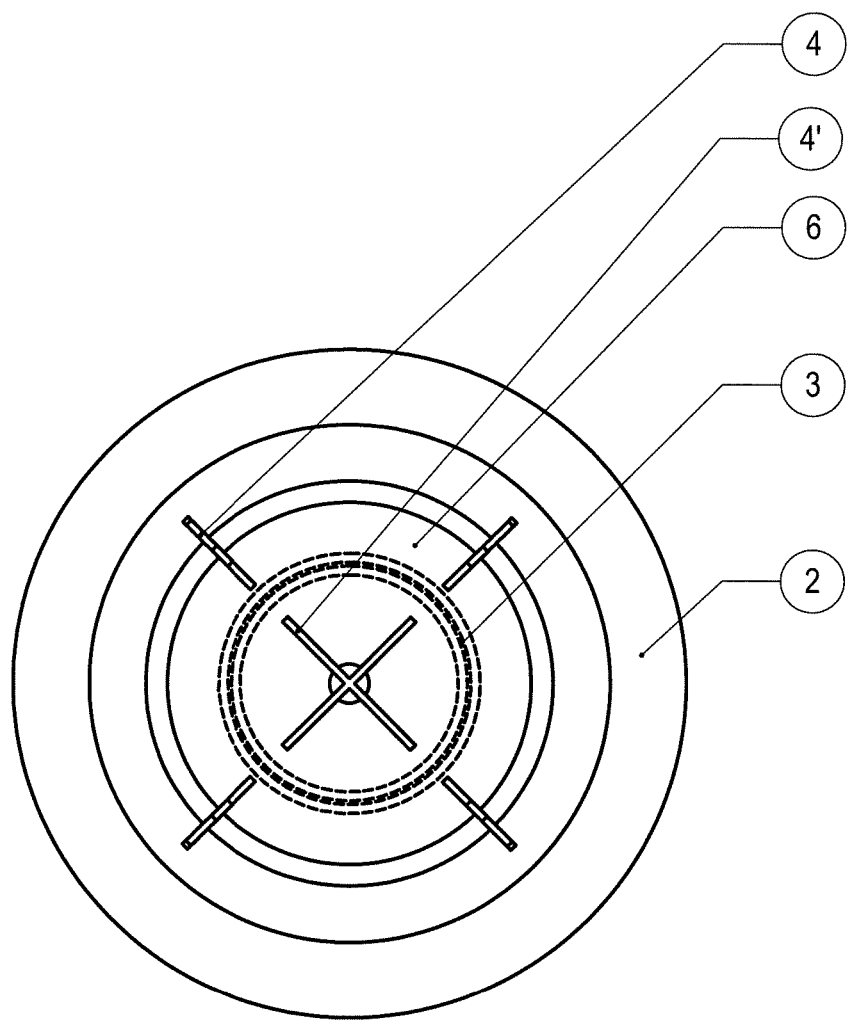
FIG. 5 schematically shows an inner view from above of the capsule shown in FIG. 4.

FIG. 5 schematically shows an inner view from above of the capsule 1 shown in FIG. 4. The figure shows the upper surface of the uniform thickness plane 2. The figure also shows the inner face of the entry surface 6 of the water under pressure of the capsule. The circular reduced thickness area 3 on the entry surface 6 of the water is indicated by concentric dotted lines. The figure also shows that the capsule is provided with reinforcement ribs 4. The reinforcement ribs 4 reinforce the entry surface 6 and simplify the opening of the circular reduced thickness areas 3 when the water under pressure flows against the outer face of the entry surface 6. The reinforcement ribs 4 shown in FIG. 5 do not intersect the reduced thickness areas 3. According to alternative embodiments of the present invention one or more of the reinforcement ribs 4 may intersect the reduced thickness areas 3. FIG. 5 also shows that the surface enclosed by the reduced thickness areas is further provided with reinforcement ribs 4'. These go through the centre of the surface enclosed by the reduced thickness area 3. In particular, FIG. 5 shows two perpendicular reinforcement ribs 4' that intersect in the centre of the surface enclosed by the reduced thickness area 3. The ribs 4' of the surface enclosed by the circular reduced thickness area 3 can be placed in different ways on the surface, for example, they could be arranged radially without intersecting. Also the number of the ribs 4' may vary. Moreover, according to further alternative embodiments of the present invention, the surface enclosed by the circular reduced thickness area 3 could not be provided with reinforcement ribs 4'. Furthermore, the system shown in FIG. 5 comprises four reinforcement ribs 4 arranged radially with respect to the centre O of the entry surface 6 so as to be equidistant from each another along the perimeter of the entry surface. In practice, the four reinforcement ribs 4 are arranged in order to divide the perimeter of the entry surface in four circumferences arcs, each of which corresponds to a central angle of 90°. The number and disposition of the reinforcement ribs can vary. For example, the system can comprise two reinforcement ribs arranged in a symmetrical way with respect to the centre of the entry surface (the perimeter of the entry surface is divided into semi-circles) or three reinforcement ribs (the perimeter of the entry surface can be divided into three arcs of circumference, each of which corresponds to a central angle of 120°). It has been observed that the presence of the reinforcement ribs 4 is very advantageous since it allows simplifying the opening of the circular reduced thickness areas due to the water under pressure that flows against the entry surface 6. In particular, the reinforcement ribs 4 stabilize and reinforce the circular outer region with respect to the reduced thickness area 3 and reduce therefore their elasticity with respect to the elasticity of the region inside the reduced thickness area 3. Moreover, the presence of the reinforcement ribs 4 prevents the entire reduced thickness area 3 from being opened due to the water under pressure since the areas near the reinforcement ribs 4 are reinforced by the reinforcement ribs themselves. When one or more portions of the circular reduced thickness areas open under the action of the water under pressure, the water enters the capsule and the pressure outside the capsule decreases. In this way there is no opening of the entire perimeter of the reduced thickness area. This can also be facilitated for example by ensuring that the circular reduced thickness area 3 does not have a constant thickness along its perimeter. In this way, the lower thickness areas open under the water under pressure, allowing the water to enter into the capsule and allowing the pressure outside the capsule to decrease.

The areas having a greater thickness do not open.

Figure 6:
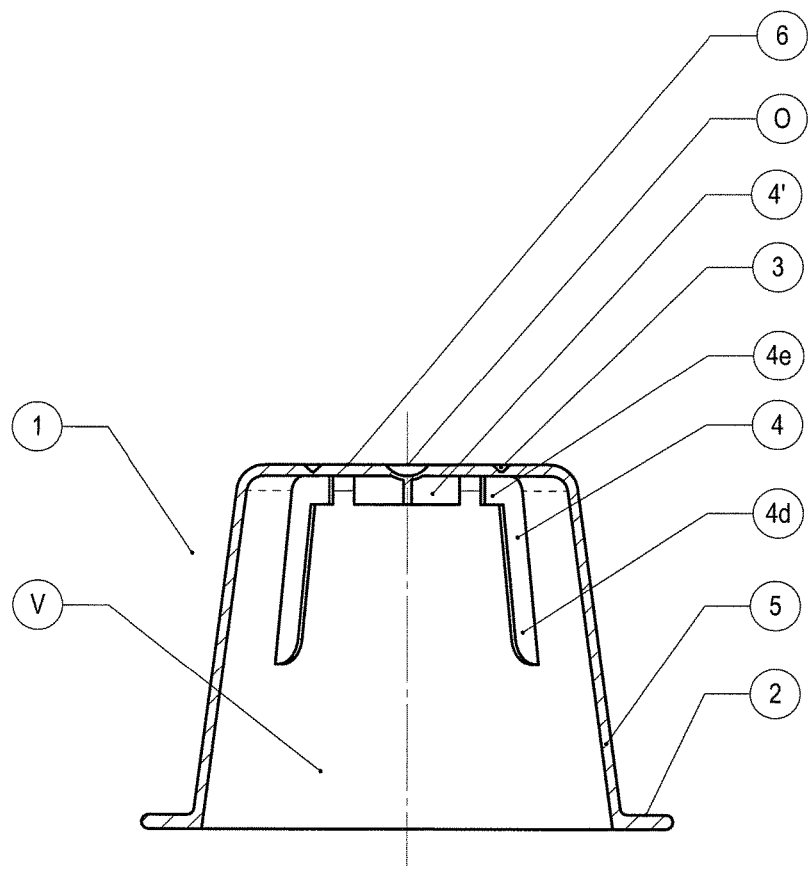
FIG. 6 schematically shows a cross-sectional view of the capsule shown in FIG. 4 along one of the diameters of the entry surface.

FIG. 6 schematically shows a cross-sectional view of the capsule 1 shown in FIGS. 4 and 5 along one of the diameters of the entry surface 6 in correspondence of which two reinforcement ribs 4 are realized. It has to be noted that the side wall 5 and the entry surface 6 of the water under pressure form the containing volume V of the capsule 1, that is, the volume that can be filled with the product necessary for the production of the desired beverage. The Figure shows in cross-section two points of the reduced thickness area 3 of the entry surface 6. Moreover, there is a depression in correspondence of the centre O of the entry surface 6 of the capsule. This depression schematically represents the injection point of the capsule, namely the point through which the material of which the capsule is made of, enters during the capsule formation process. The presence of this depression is advantageous since, in the case in which excess material accumulates in correspondence of the injection point, during the formation of the capsule, this accumulation of material is located on the bottom of the depression and therefore does not protrude with respect to the outer surface of the entry surface 6 of the capsule, avoiding in this way, the formation of protrusions or defects on the entry surface 6. FIG. 6 shows in detail the structure of the reinforcement ribs 4. Each of the reinforcement ribs 4 comprises a first portion 4*d* which extends in a direction substantially parallel to the side wall 5 of the capsule and which is adjacent to the side wall itself. In practice, each of the reinforcement ribs 4 is formed in an integral way to the side wall 5. In the example shown in FIG. 6, the first portion of the reinforcement rib 4*d* has a height equal to about half the height of the containing volume V of the capsule. The first portion can have various heights. For example, the first portion can occupy the entire height of the side wall of the capsule. In addition, each of the reinforcement ribs comprises a second portion of the base 4*e*. The second portion of the base 4*e* extends along a portion of the diameter of the entry surface 6. In the example shown in FIG. 6, the second portion base 4*e* extends from the side wall 5 of the capsule up to a portion adjacent to the reduced thickness area 3. In practice, as can be seen in FIG. 6, the portions 4*d* and 4*e* of each of the reinforcement ribs 4 are such that the reinforcement ribs 4 substantially has an L shape.

The sequence of Figures from 7 to 9 and from 10 to 11 schematically shows the main steps of the method according to the present invention.

Figure 7:
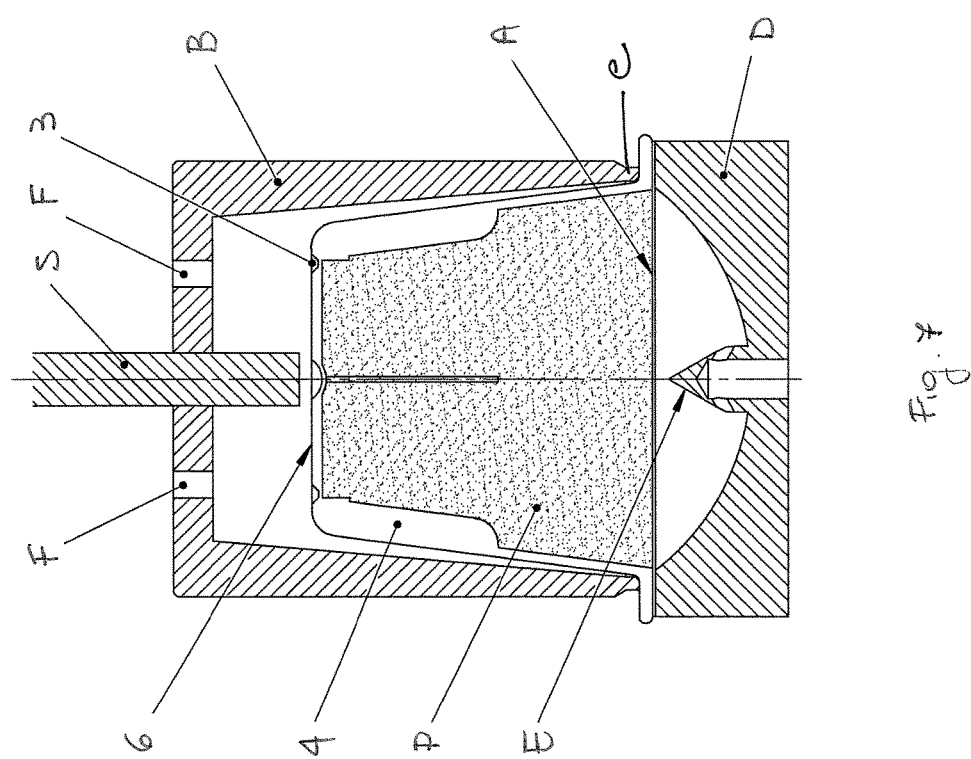
FIG. 7 schematically shows a cross-sectional view of the capsule that can be used according to an embodiment of the present invention; the inner product, the closing element, and a hollow production cylinder, pushing elements, in the illustrated case a piston and a disc that holds a needle to pierce the exit surface of the capsule, are also shown; the production cylinder, once wrapped around the capsule, hermetically closes on the plane of the capsule in contrast to the disc which holds the needle.

FIG. 7 schematically shows a view of the capsule 1 shown in Figures from 4 to 6, with a circular reduced thickness area 3 centered on the centre O of the entry surface 6, filled with the product P and closed hermetically by the closing element A. Even if in the shown case the used capsule has a circular reduced thickness area, any of the capsules described above can be used. Some of the elements of a beverage-making machine for beverages that can be used according to the method object of the present invention and in which the capsules described above can be used are also schematically shown. In particular, a hollow production cylinder B having a peripheral border C smooth or geared is shown, a pushing element S and a disk D that causes a needle E to pierce the exit surface of the beverage from the capsule. The pushing means S shown in the Figure are in the form of a piston, but they can alternatively be needles, knives or the like. The pushing means can be integral with the production cylinder B or can, alternatively, be of the mobile type with respect to the hollow cylinder B. The piston shown in FIG. 7 is of the mobile type. The piston is shown in the pulled back position, namely not in contact with the entry surface 6 of the capsule 1. The containing volume V of the capsule 1 has been filled with the product P. The product P can comprise, for example coffee powder, tea leaves or other herbs, powdered milk, cocoa powder and so on. In general, the product P can be an infusion or a soluble product. The closing element A has been applied to the capsule 1 onto the uniform thickness plane 2 so as to hermetically close the capsule 1. For example, the closing element A can be thermo-welded to the upper surface of the uniform thickness plane 2. The closing element A may comprise a closing membrane made of peelable barrier film. FIG. 7 schematically shows a view of the capsule 1 after the production cylinder B, once it has wrapped the capsule, closes in a hermetic way on the plane of the capsule against the disk D that carries the needle E. The capsule 1 is placed inside the production cylinder B of the machine.

Figure 8:
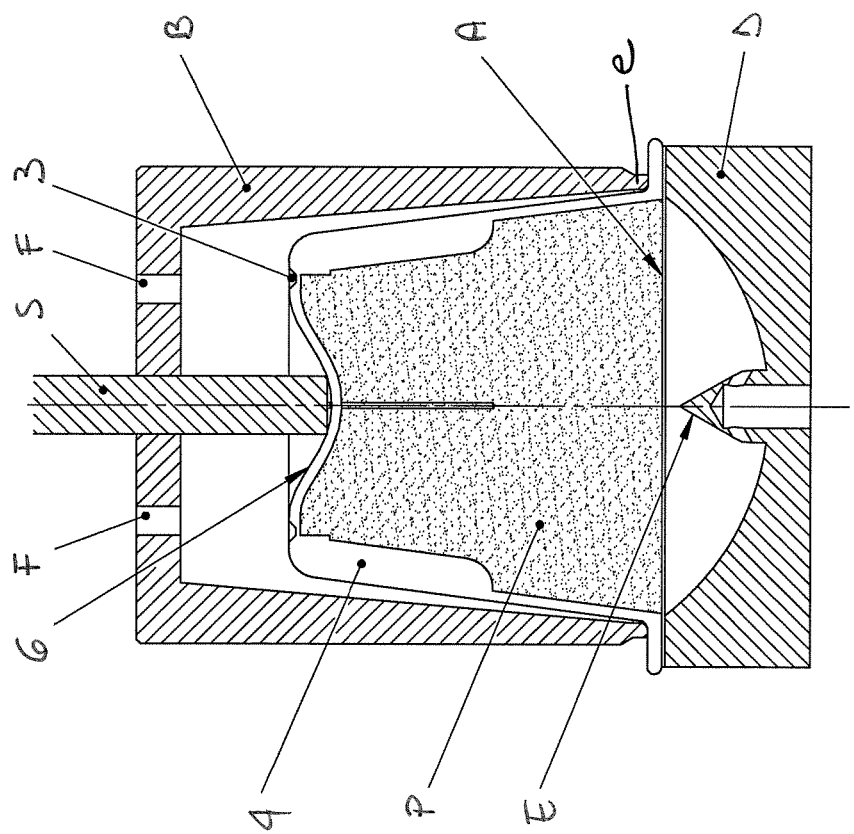
FIG. 8 schematically shows a cross-sectional view of the system shown in FIG. 7 in which the piston pushes on the entry surface of the capsule, causing the same to be bent due to the effect of this pressure.

FIG. 8 schematically shows a view of the system shown in FIG. 7 after the piston has been moved towards the entry surface 6 of the capsule 1. The piston presses on the entry surface 6 of the capsule 1. The pressure of the piston is such that the entry surface 6 of the capsule 1 bends inwardly with respect to the capsule 1 and the circular reduced thickness area 3 is put under tension, but does not open. The bending of the entry surface 6 of the capsule 1 is contrasted and limited by the presence of the reinforcement ribs 4.

Figure 9:
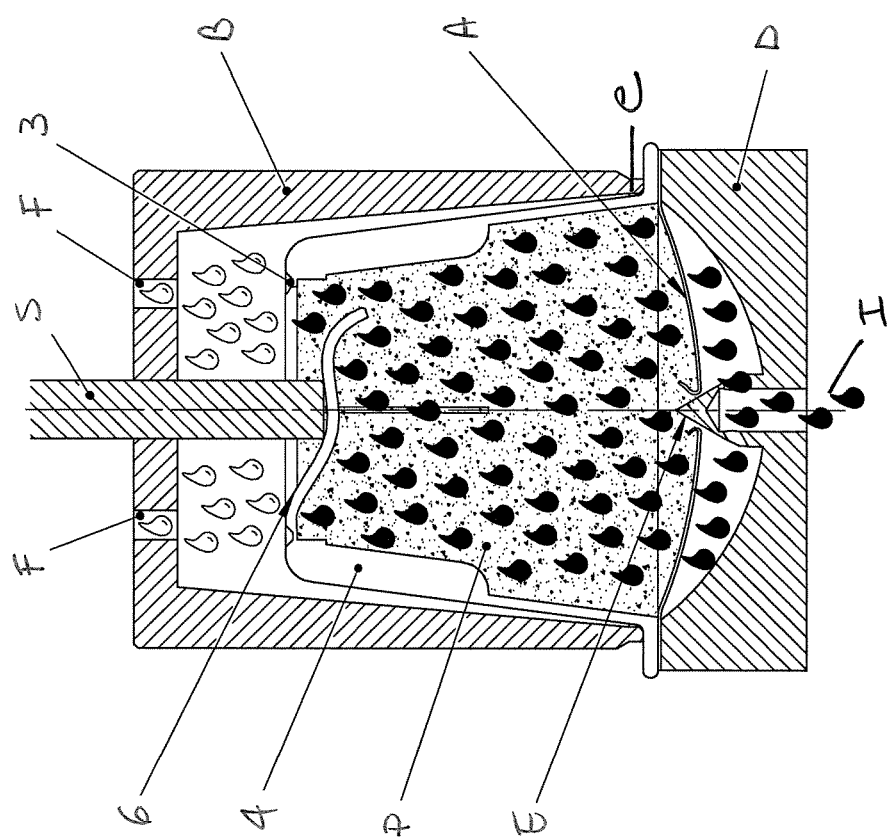
FIG. 9 schematically shows a cross-sectional view of the system shown in FIG. 7 after the injection means have started to inject water under pressure, the base of the capsule is further bent, the reduced thickness areas are opened, the water enters inside the capsule, the closing element is deformed outwardly against the needle, which has pierced the closing element and the beverage flows outwardly.

FIG. 9 schematically shows a view of the system shown in FIG. 7 after the injection means have started injecting water under pressure in the housing volume of the production cylinder B. Since the housing volume of the production cylinder B is closed, the water under pressure injected into the housing volume of the production cylinder B presses against the outer surface of the entry surface 6 of the capsule. By increasing the pressure of the water in the housing volume of the production cylinder B, the reduced thickness areas 3 of the bottom of the capsule open due to the water under pressure, allowing the entry of water under pressure inside the capsule 1. The water under pressure enters therefore into the containing volume V of the capsule in which the product P is contained. The pre-infusion of the product P contained in the capsule, in the case in which the product P is an infusion product starts. If, on the other hand, the product P is a soluble product, its melting begins. When the reduced thickness areas open, the pressure on the entry surface 6 of the capsule 1 decreases. Therefore, if the capsule has more than one reduced thickness area not all of them necessarily open and if the reduced thickness area is circular, as shown in the Figure, it opens only partially. In this way the entry surface 6 of the capsule 1 never completely detaches from the side wall of the capsule 5 and cannot therefore fall within the containing volume V of the capsule 1.

FIG. 9 also shows that, as the pressure of the liquid inside the capsule 1 increases, the outer surface of the capsule opposed to the entry surface 6 bends outwardly reaching the needle E of the beverage-making disc D of the machine. The bending of the exit surface of the capsule is such that the needle E of the beverage-making disc D of the machine pierces the closing element and the beverages E flow outside. Since the pushing means continue to bend, the entry surface 6 of the capsule 1 and the injection means continue to inject water under pressure inside the housing volume of the cylinder of the machine, the reduced thickness area 3 of the entry surface 6 remain open and allow the continuous flow of water inside the capsule 1. By regulating the flow of water emitted by the injection means, both the quantity and the quality of the obtained beverages can be regulated.

Figure 10:
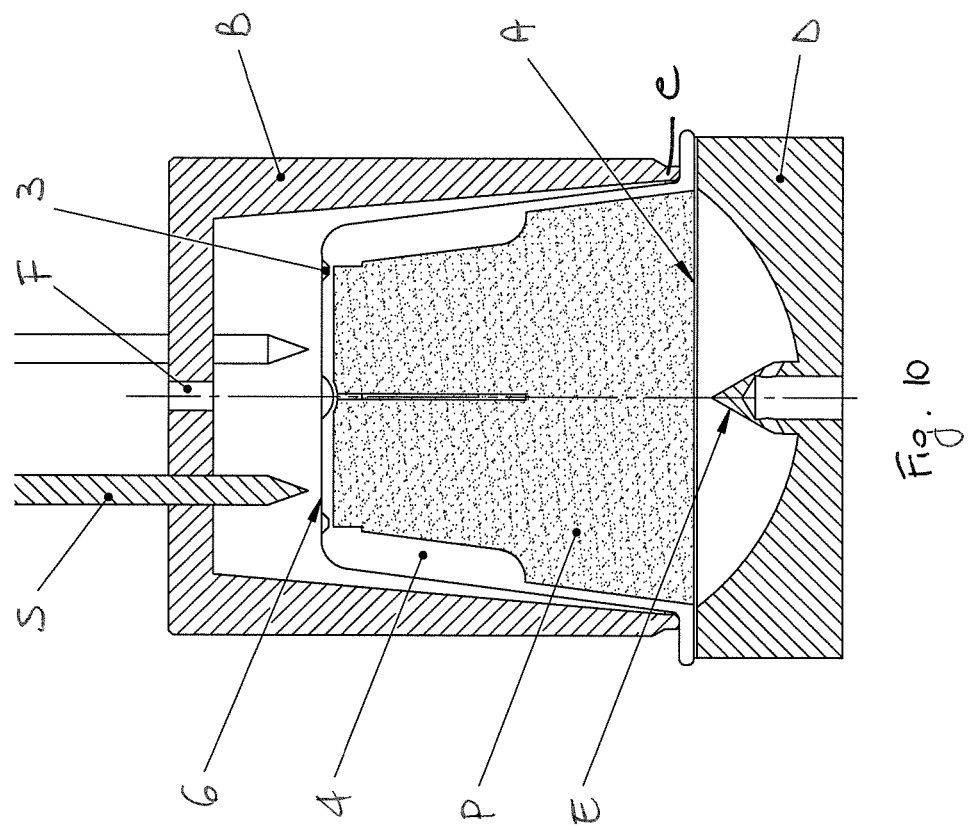
FIG. 10 schematically shows a cross-sectional view of the capsule that can be used according to an embodiment of the present invention; the inner product, the closing element, an hollow production cylinder, pushing elements, in the case shown push needles, and a disc that holds a needle to perforate the exit surface of the capsule, are shown; once the production cylinder has been wrapped around the capsule, it closes with a hermetic seal on the plane of the capsule in contrast to the disc which holds the needle.
Figure 11:
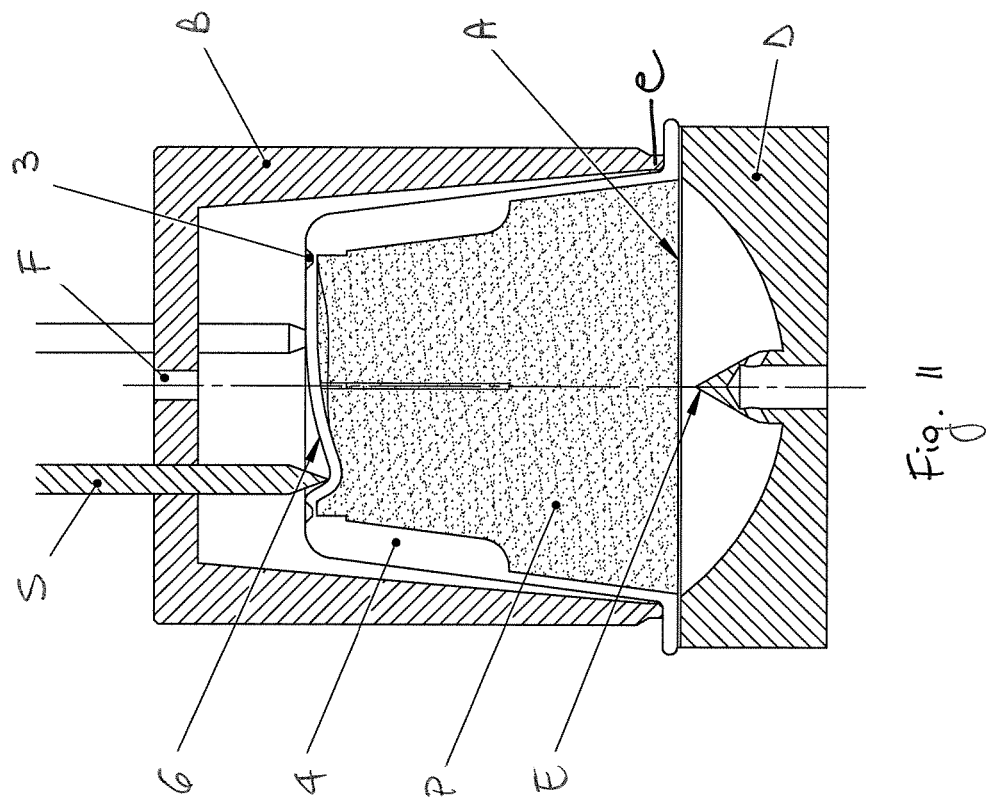
FIG. 11 schematically shows a cross-sectional view of the system shown in FIG. 10 in which needles push on the entry surface of the capsule, that is, therefore, bent due to the effect of this pressure.

FIGS. 10, 11 and 12 correspond to FIGS. 7 to 9, respectively. The difference between FIGS. 7 to 9 and FIGS. 10 to 12 consists in that, in the second case, the beverage-making machine has a pushing means S in the form of pushing needles. The pushing needles shown in the FIGS. 10 to 12 perform in a similar way with respect to the piston shown in FIGS. 7 to 9. They are movable with respect to the production cylinder B and they lean on the entry surface 6 of the capsule 1 deforming and putting under tension the one or more reduced thickness areas. The pushing needles do not penetrate or only partially penetrate the entry surface 6, and do not pierce it. As in the previous case, the pressure of the incoming water will cause the opening of the one or more reduced thickness areas.

Even if the present invention was described with reference to the embodiments described above, it is now clear for the skilled person that it is possible to realize several modifications of the present invention in light of the above teaching and in the ambit of the appended claims without departing from the object and scope of protection of the invention.

For example, even if beverage-making machines were shown with pushing means, such as, for example, a piston and pushing needles, the pushing means may be another element of the beverage-making machine that exercises pressure on the entry surface of the capsule, without piercing the entry surface and without inducing the opening of the reduced thickness areas. Moreover, even if the shown pushing means are movable with respect to the production cylinder B, the pushing means can also be integral with this element of the beverage-making machine. In this way, when the capsule 1 is inserted inside the beverage-making machine and production cylinder B is closed on it, the pushing means automatically presses on the entry surface 6 of the capsule 1.

Finally, those ambits that are deemed to be familiar for the skilled person have not been described in order not to unnecessarily obscure the invention described.

Consequently, the invention is not limited to the embodiments described above, but only by the scope of protection of the appended claims.

REFERENCE SIGNS

In the individual Figures, each particular Figure is marked as follows:
1 is the capsule;
2 is the uniform thickness plane;
3 are the reduced thickness areas on the water entry surface of the capsule;
4 are the reinforcement ribs on the water entry surface of the capsule;
4a is the base of a reinforcement rib;
4b and 4c are the arms of a reinforcement rib;
4d and 4e are the first and the second portion of a reinforcement rib;
4' are further reinforcement ribs;
5 is the lateral wall of the capsule;
6 is the entry surface of the water under pressure in the capsule;
A is the closing element of the capsule;
B is the liquid production cylinder of the machine for the use of capsules;
C is the peripheral border of the hollow cylinder B
D is the disk supporting the needle of the machine for using capsules;
E is the needle of the machine for using capsules;
F is the hole for the entry of the water under pressure in the production cylinder of the machine;
I is the obtained beverage;
O is the centre of the entry surface of the water under pressure in the capsule
P is the product contained in the capsule;
S is the pushing means of the beverage-making machine;
V is the containing volume of the capsule.

The invention claimed is:

1. Method for the production of beverages by means of a capsule comprising a side wall and an entry surface for the entrance of water under pressure into the capsule, said side wall and said entry surface forming the containment volume for containing the infusion or soluble product, and said entry surface comprising one or more reduced thickness areas, wherein said method comprises the following steps: pushing said entry surface of said capsule using pushing means to stretch said one or more reduced thickness areas of said entry surface, and injecting a flux of water under pressure against said entry surface of said capsule so that the step of injecting a flux of water under pressure against said entry surface of said capsule opens said one or more reduced thickness areas of said entry surface so as to allow the flux of water under pressure to enter into said capsule.

2. Method according to claim 1 wherein said pushing means comprise one or more needles, blades, or pistons.

3. Method according to claim 1 wherein said pushing means do not pierce or only partially pierce said entry surface of said capsule so as not to punch said entry surface.

4. Method according to claim 1 wherein said pushing means press onto said entry surface of said capsule in portions of said entry surface not occupied by said reduced thickness areas.

5. Method according to claim 1 wherein said method further comprises the following step: punching of an exit surface of the capsule opposed with respect to said entry surface so as to allow the beverage to exit from the capsule.

6. A method of producing a beverage from a product inside of a capsule, the capsule having an entry surface with a reduced thickness area, side walls, and a closing element opposing the entry surface comprising the steps of:
    pushing the entry surface using pushing means with a force sufficient to place a tension on the reduced thickness area;
    directing a fluid on the entry surface with sufficient pressure to open the reduced thickness area permitting the fluid to enter the capsule and contact the product; and
    piercing the closing element,
    whereby the beverage is formed and dispensed from the capsule.

7. The method of producing a beverage as in claim 6 further comprising the step of:
    placing a reinforcement rib on the capsule.

8. The method of producing a beverage as in claim 7 further comprising the step of:
    replacing elastically the reduced thickness area into a closed position.

9. The method of producing a beverage as in claim 8 wherein:
    said step of replacing elastically the reduced thickness area into a closed position is performed by forming a reduced thickness area with an elasticity greater than an elasticity of the reinforcing rib,
    whereby there is a tendency for the reduced thickness area to be repositioned to an initial configuration closing the reduced thickness areas.

\* \* \* \* \*